(12) United States Patent
Shimoji et al.

(10) Patent No.: US 11,060,472 B2
(45) Date of Patent: Jul. 13, 2021

(54) ENGINE WORKING MACHINE

(71) Applicant: KUBOTA Corporation, Osaka (JP)

(72) Inventors: Hideo Shimoji, Sakai (JP); Yuki Ishii, Sakai (JP); Tatsuya Ueshima, Sakai (JP); Hiroki Murata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 16/431,767

(22) Filed: Jun. 5, 2019

(65) Prior Publication Data

US 2020/0003140 A1 Jan. 2, 2020

(30) Foreign Application Priority Data

Jun. 30, 2018 (JP) .............................. JP2018-125640
Dec. 28, 2018 (JP) .............................. JP2018-246773

(51) Int. Cl.
*F02D 41/00* (2006.01)
*F02D 41/02* (2006.01)
(Continued)

(52) U.S. Cl.
CPC ........ *F02D 41/0245* (2013.01); *F02B 63/042* (2013.01); *F02D 29/06* (2013.01);
(Continued)

(58) Field of Classification Search
CPC .... F02D 41/0245; F02D 41/027; F02D 29/06; F02D 31/007; F02D 2200/082;
(Continued)

(56) References Cited

U.S. PATENT DOCUMENTS 6,949,843 B2 * 9/2005 Dubovsky ............... H02J 3/382
307/64
2005/0034449 A1 * 2/2005 Frieden ................. F01N 3/2006
60/284
(Continued)

FOREIGN PATENT DOCUMENTS

| EP | 2992197 A1 | 3/2016 |
| JP | 2015-031178 A | 2/2015 |
| WO | 2014179641 A1 | 11/2014 |

OTHER PUBLICATIONS

Extended European Search Report dated Oct. 21, 2019 in EP Application No. 19171594.5.
(Continued)

*Primary Examiner* — Phutthiwat Wongwian
*Assistant Examiner* — Sherman D Manley
(74) *Attorney, Agent, or Firm* — Panitch Schwarze Belisario & Nadel LLP (57) ABSTRACT

There is provided an engine working machine capable of suppressing functional disorder of an exhaust catalyst and decline of engine performance. If, during input of a dummy load to an engine, fuel supply volume of a fuel supply device reaches a predetermined dummy load cutoff determination value as a result of elevation of a total load for an engine including the dummy load and a work load, then an electronic control device switches a load switching device to cut off the dummy load; and if, during input of the work load without including the dummy load to the engine, the fuel supply volume of the fuel supply device reaches a predetermined dummy load re-input determination value as a result of decline of the work load, then the electronic control device switches the load switching device to re-input the dummy load.

2 Claims, 5 Drawing Sheets

(51) Int. Cl.
*F02B 63/04* (2006.01)
*F02D 29/06* (2006.01)
*F01N 3/035* (2006.01)
*F01N 3/10* (2006.01)

(52) U.S. Cl.
CPC .......... *F02D 41/027* (2013.01); *F01N 3/035* (2013.01); *F01N 3/103* (2013.01)

(58) Field of Classification Search
CPC ....... F02D 2200/0614; F02D 2041/026; F02B 63/042; F01N 3/103; F01N 3/035
See application file for complete search history.

(56) References Cited

U.S. PATENT DOCUMENTS

| 2008/0048451 | A1* | 2/2008 | Herzog | F01D 13/00 290/7 |
| 2008/0276610 | A1* | 11/2008 | McDowell | B60K 6/26 60/517 |
| 2009/0044520 | A1* | 2/2009 | Farell | F01N 3/023 60/295 |
| 2010/0186373 | A1* | 7/2010 | Pierz | F01N 3/027 60/274 |
| 2012/0003131 | A1* | 1/2012 | Ibrahim | B01D 46/002 423/212 |
| 2014/0327248 | A1* | 11/2014 | Gunn | B60K 6/46 290/40 R |
| 2016/0153330 | A1* | 6/2016 | Takahashi | F01N 3/0232 60/274 |

OTHER PUBLICATIONS

Office Action dated May 3, 2021 in European Application No. 19171594.5.

* cited by examiner

ENGINE WORKING MACHINE

CROSS-REFERENCE TO RELATED APPLICATION

This application claims priority under 35 U.S.C. § 119(b) to Japanese Application Nos. 2018-125640, filed Jun. 30, 2018 and 2018-246773 field Dec. 28, 2018, the disclosures of which are incorporated by reference herein in their entirety.

BACKGROUND OF THE INVENTION

(1) Field of the Invention

The present invention relates to an engine working machine.

(2) Description of Related Art

In a conventional engine working machine, HC tightly adhered on an inlet or on a surface of a catalyst may remain uncombusted, occasionally resulting in functional disorder of the exhaust catalyst.

Further, air intake would become short, occasionally resulting in decline of engine output or incomplete combustion, and decline of engine performance.

SUMMARY OF THE INVENTION

It is therefore an object of the present invention to provide an engine working machine capable of suppressing functional disorder of the exhaust catalyst and decline of engine performance.

In the engine working machine of the present invention, when, during input of a dummy load to an engine, fuel supply volume of a fuel supply device reaches a predetermined dummy load cutoff determination value as a result of elevation of a total load for an engine including the dummy load and a work load, the electronic control device switches a load switching device to cut off the dummy load; and when, during input of the work load without including the dummy load to the engine, the fuel supply volume of the fuel supply device reaches a predetermined dummy load re-input determination value as a result of decline of the work load, the electronic control device switches the load switching device to re-input the dummy load, and during engine operation, the fuel supply volume is kept at a value exceeding a predetermined set value, so that exhaust temperature at an inlet of the exhaust catalyst is kept at a value exceeding a predetermined set value.

The present invention yields the following effects.

HC dissipates due to catalytic combustion or vaporization before adhering tightly to the inlet or on the surface of the exhaust catalyst, making it possible to suppress functional disorder of the exhaust catalyst due to residence of HC at the inlet of exhaust catalyst.

In addition, it is possible to suppress decline of engine output and incomplete combustion due to shortage of air intake, and also suppress decline of engine performance.

DETAILED DESCRIPTION OF PREFERRED EMBODIMENTS

FIGS. 1 to 5 illustrate the engine working machine according to an embodiment of the present invention. In this embodiment, an engine generator in the form of vertical water-cooled, in-line, four-cylinder diesel engine equipped with an exhaust treatment device will be described.

The engine working machine will be outlined below.

Figure 1:
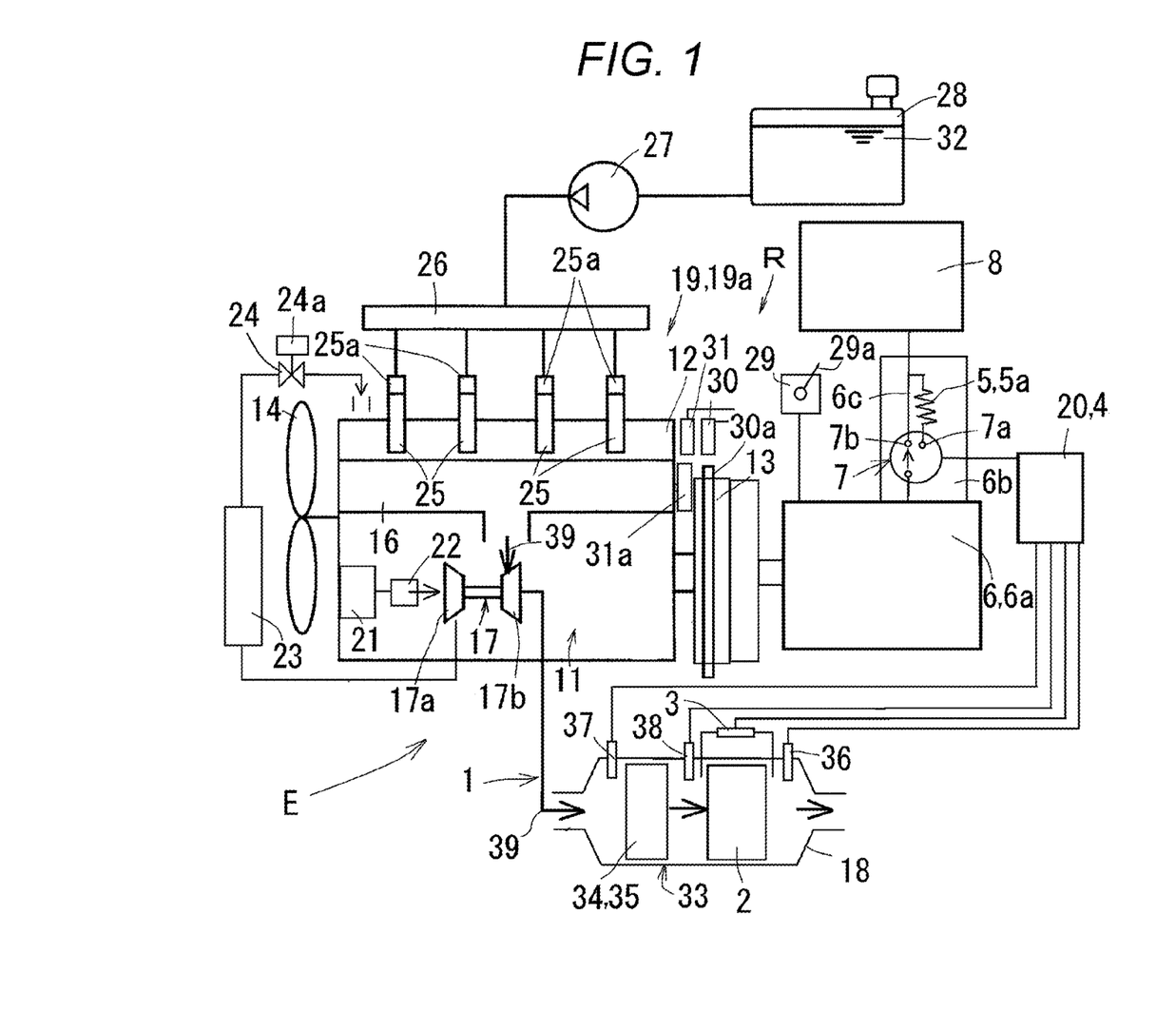
FIG. 1 is a schematic diagram of an engine working machine according to an embodiment of the present invention.

As illustrated in FIG. 1, an engine (E) has a cylinder block (11), a cylinder head (12) assembled on an upper part of the cylinder block (11), a flywheel (13) disposed on the rear side of the cylinder block (11), an engine cooling fan (14) disposed on the front side of the cylinder block (11), an intake manifold (not illustrated) disposed on one lateral side of the cylinder head (12), an exhaust manifold (16) disposed on the other lateral side of the cylinder head (12), a supercharger (17) connected to the exhaust manifold (16), and, an exhaust treatment case (18), a fuel supply device (19a), and an electronic control device (20) which are disposed on the exhaust downstream side of the supercharger (17).

A work load device (6) is connected to the flywheel (13).

For the work load device (6), employable is a generator (6a), a hydraulic device or a welding machine. The generator (6a) is now employed in this embodiment.

An intake device will be outlined below.

As illustrated in FIG. 1, the intake device has a compressor (17a) of the supercharger (17), an air cleaner (21) disposed on the intake upstream side of the compressor (17a), an air flow sensor (22) disposed between the air cleaner (21) and the compressor (17a), an intercooler (23) disposed on the intake downstream side of the compressor (17a), an intake throttle valve (24) disposed on the intake downstream side of the intercooler (23), and an intake manifold (not illustrated) disposed on the intake downstream side of the intake throttle valve (24).

The air flow sensor (22), and an electric actuator (24a) of the intake throttle valve (24) are electrically connected to the electronic control device (20).

For the electronic control device (20), used is an engine ECU. ECU is an abbreviation for electronic control unit, which is a microcomputer.

The fuel supply device (19a) will be outlined as below.

As illustrated in FIG. 1, the fuel supply device (19a) is of common rail type, and has a plurality of fuel injectors (25) inserted to the individual cylinders, a common rail (26) that distributes a fuel stored under pressure to the plurality of fuel injectors (25), a fuel supply pump (27) that pumps the fuel to the common rail (26), and a fuel tank (28).

The fuel supply pump (27), and a solenoid valve (25a) of the fuel injector (25) are electrically connected to the electronic control device (20). To the electronic control device (20), also electrically connected are a target rotational speed sensor (29), a crankshaft sensor (30), and a cylinder discrimination sensor (31). The target rotational speed sensor (29) detects target rotational speed of engine, and the crankshaft sensor (30) detects actual rotational speed of engine and crank angle. The cylinder discrimination sensor (31) detects combustion stroke of the individual cylinders.

For a case where an accelerator is used in place of a target rotational speed setting lever, such as in a tractor or combine harvester, employed is an accelerator sensor in place of a target rotational speed sensor, in which the target rotational speed is set based on an accelerator position detected by the accelerator sensor.

Alternatively, also employable of course is a device that can variably control the rotational speed of engine, using a signal sent from the accelerator sensor or vehicle ECU via CAN communication or the like.

In the fuel supply device (19a), engine load is calculated by the electronic control device (20) based on deviation between target rotational speed and actual rotational speed of the engine, the solenoid valve (25a) of the fuel injector (25) is opened in a predetermined timely manner for a predetermined length of time, corresponding to the target rotational speed of engine and the engine load; and the fuel injector (25) injects a predetermined volume of fuel (32) to the individual cylinders in a predetermined timely manner. The fuel (32) is now a diesel fuel.

As illustrated in FIG. 1, the target rotational speed sensor (29) detects a set position of a target rotational speed setting lever (29a) pointing the target rotational speed. A potentiometer is used for the target rotational speed sensor (29). The target rotational speed is set to a predetermined rotational speed typically to 1800 rpm or 3600 rpm, using the target rotational speed setting lever (29a).

As illustrated in FIG. 1, the crankshaft sensor (30) detects passage of projections of a crankshaft detection disk (30a) attached to the flywheel (13). The crankshaft detection disk (30a) has, along its circumference, one reference projection and a large number of phase projections arranged at regular intervals. Using passing speed of these projections, the electronic control device (20) calculates the actual rotational speed of the engine, and calculates the crank angle based on phase difference between the phase projections having been passed and the reference projection.

The cylinder discrimination sensor (31) detects passage of projections of a cylinder discrimination disk (31a) attached to a camshaft of a valve train (not illustrated). The cylinder discrimination disk (31a) has one projection on its circumference. Referring to passage of this projection, the electronic control device (20) discriminates 4-cycle combustion strokes.

An electromagnetic pickup sensor is now used for the crankshaft sensor (30) and the cylinder discrimination sensor (31).

The exhaust device will be outlined below.

As illustrated in FIG. 1, the exhaust device has the exhaust manifold (16), an exhaust turbine (17b) of the supercharger (17) disposed on the exhaust downstream side of the exhaust manifold (16), and an exhaust treatment device (33) provided on the exhaust downstream side of the exhaust turbine (17b). A series of paths from the exhaust manifold (16) up to the exhaust treatment device (33) makes up an exhaust path (1).

The exhaust treatment device (33) will be outlined below.

The exhaust treatment device (33) has the exhaust treatment case (18) disposed on the exhaust downstream side of the exhaust turbine (17b) of the supercharger (17), a DOC (35) disposed on the exhaust upstream side inside the exhaust treatment case (18), a DPF (2) disposed on the exhaust downstream side in the exhaust treatment case (18).

The DPF, abbreviated from diesel particulate filter, captures PM in engine exhaust. PM is an abbreviation for particulate matter. As illustrated in FIG. 1, the DPF (2) uses a wall-flow type ceramic honeycomb structure having inside a large number of cells (not illustrated) that are juxtaposed along an axial length direction, with an inlet and an outlet of neighboring cells alternately plugged.

The DOC, abbreviated from diesel oxidation catalyst, oxidizes carbon monoxide (CO) and nitrogen monoxide (NO) contained in the engine exhaust. The DOC (35) uses a flow-through type ceramic honeycomb structure having inside a large number of cells (not illustrated) that are juxtaposed along the axial length direction in a penetrating manner, with an oxidizing catalyst component such as platinum, palladium or rhodium supported in the cells.

The exhaust treatment device (33) has a regenerator (R) for the DPF (2).

The regenerator (R) for the DPF (2) has a PM deposition estimation device (4) that estimates the amount of PM deposited on the DPF (2), an exhaust heater (19), and the electronic control device (20), and is designed so that the electronic control device (20) conducts a treatment for regenerating the DPF (2) in response to the amount of PM deposition on the DPF (2) reaching a predetermined regeneration start value. In the treatment for regenerating the DPF (2), exhaust (39) is heated by the exhaust heater (19) so as to combust the PM deposited on the DPF (2).

The PM deposition estimation device (4) has the electronic control device (20), and estimates the amount of PM deposited on the DPF (2), based on differential pressure between an exhaust inlet side and an exhaust outlet side of the DPF (2) detected by a differential pressure sensor (3). Alternatively, the amount of PM deposited on the DPF (2) may be estimated based on an integrated time of engine operation or integrated value of fuel supply volume, in place of using the differential pressure detected at the DPF (2).

The exhaust heater (19) has the intake throttle valve (24), the fuel supply device (19a), the DOC (35), an exhaust temperature sensor (37) on the DOC inlet side which detects exhaust temperature on the exhaust inlet side of the DOC (35), an exhaust temperature sensor (36) on the DPF outlet side which detects exhaust temperature on the exhaust outlet side of the DPF (2), and an exhaust temperature sensor (38) on the DPF inlet side which detects exhaust temperature on the exhaust inlet side of the DPF (2).

Each of the sensors (36) (37) (38) is electrically connected to the electronic control device (20).

As illustrated in FIG. 1 in the exhaust treatment device (33), PM contained in the exhaust (39) from the engine is captured by the DPF (2), the PM deposited on the DPF (2) is continuously oxidized or combusted at relatively low temperatures using nitrogen dioxide ($NO_2$) obtained by oxidizing NO in the exhaust (39) using the DOC (35). Then upon arrival of the differential pressure detected by the differential pressure sensor (3) at the predetermined regeneration request value, the common rail type fuel supply device (19a) performs post injection, while being controlled by the electronic control device (20), so as to subject unburnt fuel fed to the exhaust (39) to catalytic combustion in the DOC (35), thereby the exhaust (39) is heated, and the PM deposited on the DPF (2) is combusted at relatively high temperatures. The DPF (2) is thus regenerated.

When the exhaust temperature is low, and the inlet exhaust temperature of the DOC (35) does not reach an activation temperature of the DOC (35), the intake throttle valve (24) is throttled under the control by the electronic control device (20), so as to elevate the exhaust temperature.

Start point of the DPF regenerating treatment is defined as described below. When the inlet exhaust temperature of the DOC (35) has reached the activation temperature of the DOC (35) at a time point the differential pressure detected by the differential pressure sensor (3) reached the regeneration request value, and the post injection starts at this time point, such start point of post injection is defined to be the start point of the DPF regenerating treatment.

When inlet exhaust temperature of the DOC (35) has not reached the activation temperature of the DOC (35) at a time point where the differential pressure detected by the differential pressure sensor (3) reached the regeneration request value, and the intake throttle valve (24) is tightened, a start point where the intake throttle valve (24) is tightened is defined to be the start point of the DPF regenerating treatment. In this case, a time point where the post injection is started, upon arrival of the inlet exhaust temperature of the DOC (35) at the activation temperature of the DOC (35), may be defined to be the start point of the DPF regenerating treatment.

Note that, in place of the post injection using the common rail type fuel supply device (19a), employable is exhaust pipe injection by which unburnt fuel is injected into the exhaust (39), through an exhaust pipe fuel injector (not illustrated) disposed between the exhaust turbine (17b) of the supercharger (17) and the DOC (35). Alternatively, the exhaust may be heated making use of heat generation of an electric heater or throttling of an exhaust throttle valve, in place of the post injection using the common rail type fuel supply device (19a).

As illustrated in FIG. 1, the engine working machine has the engine (E), an exhaust catalyst (34) disposed on an exhaust path (1) of the engine (E), the fuel supply device (19a) that increases or decreases the fuel supply volume towards a combustion chamber in response to increase or decrease of an engine load, a dummy load device (5), the work load device (6), a load switching device (7) that switches between input and cutoff of a dummy load to and from the engine (E), and the electronic control device (20) that controls switching of the load switching device (7).

Figure 2:
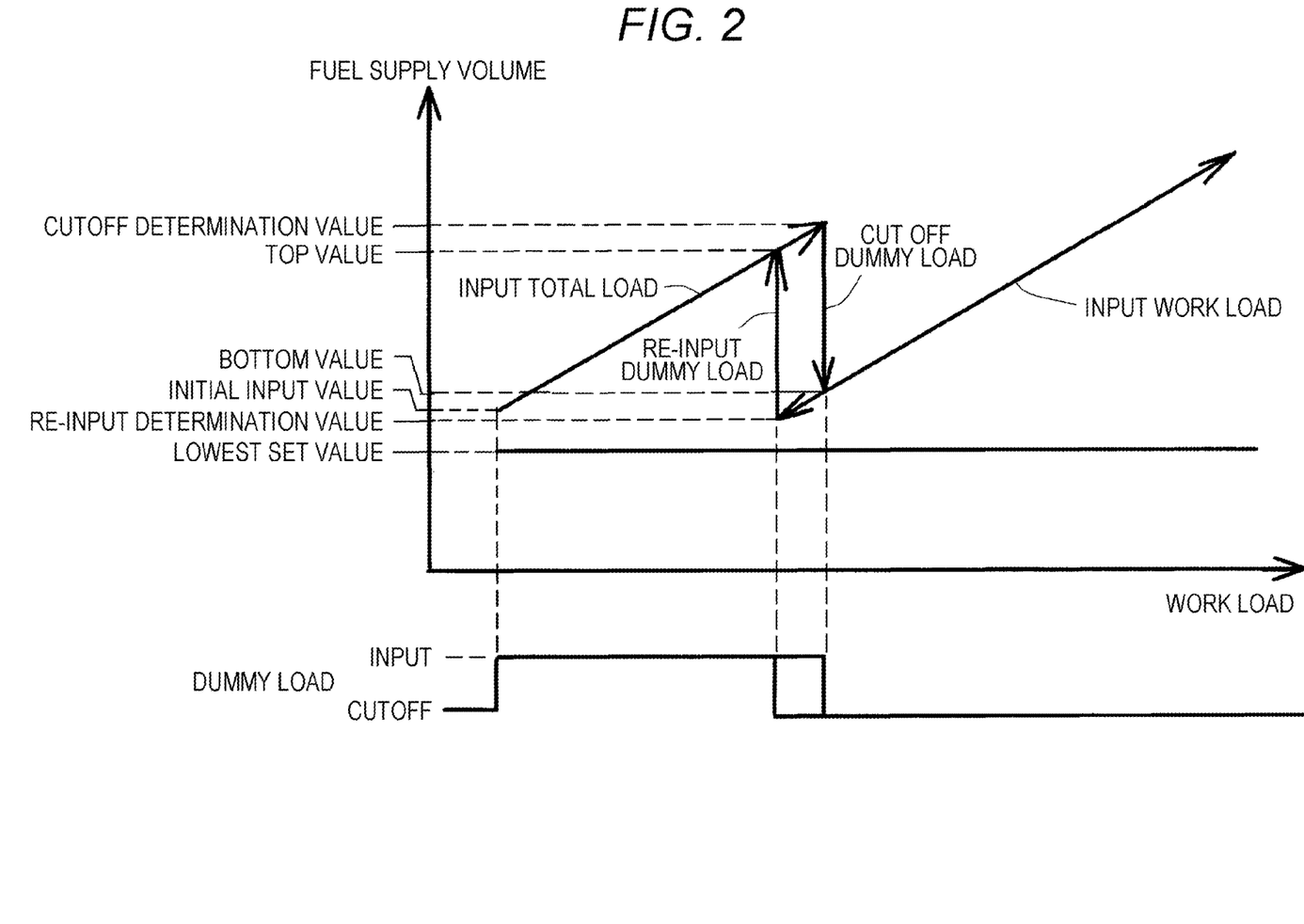
FIG. 2 is a graph illustrating a relation between load of the engine working machine illustrated in FIG. 1, and fuel supply volume.

As illustrated in FIG. 2, in the engine working machine, when, during input of the dummy load to the engine (E), the fuel supply volume of the fuel supply device (19a) reaches a predetermined dummy load cutoff determination value as a result of elevation of the total load for the engine including the dummy load and the work load, then the electronic control device (20) switches the load switching device (7) to cut off the dummy load; meanwhile when, during input of work load without including the dummy load to the engine, the fuel supply volume of the fuel supply device (19a) reaches a predetermined dummy load re-input determination value as a result of decline of the work load, then the electronic control device (20) switches the load switching device (7) to re-input the dummy load, thereby during engine operation, the fuel supply volume is kept at a value exceeding a predetermined set value, so that exhaust temperature at an inlet of the exhaust catalyst (34) is kept at a value exceeding a predetermined set value.

Hence as illustrated in FIG. 2, during engine operation, even if the work load without including the dummy load declines, the dummy load is input to keep the exhaust temperature at the inlet of the exhaust catalyst (34) at a value exceeding a predetermined set value, so that HC dissipates due to catalytic combustion or vaporization before adhering tightly to the inlet or on the surface of the exhaust catalyst (34), making it possible to suppress functional disorder of the exhaust catalyst (34) due to residence of HC at the inlet of the exhaust catalyst (34).

In addition, when the exhaust temperature at the inlet of the exhaust catalyst (34) is desired to be elevated, it is no longer necessary, during engine operation, to throttle the intake throttle valve (24), or the degree of throttling may be reduced, and this successfully suppresses decline of engine output and incomplete combustion due to shortage of air intake, and also successfully suppresses decline of engine performance.

HC is an abbreviation for hydrocarbon, and means PM and SOF. PM is an abbreviation for particulate matter, meanwhile SOF is an abbreviation for soluble organic fraction, which is composed of unburnt fuel and lubricating oil.

The exhaust catalyst (34), which is typically the DOC (35), may alternatively employ other exhaust catalyst such as an SCR catalyst. SCR catalyst is abbreviated from selective catalytic reduction-type catalyst, for which a flow-through honeycomb type one having inside a large number of cells that are juxtaposed along the axial length direction in a penetrating manner has been used.

As illustrated in FIG. 1, the engine generator has the generator (6a) as the work load device (6). An output section (6b) of the generator (6a) has an output circuit (6c) directed to an electric device (8); the dummy load device (5) that has a dummy electric resistor (5a); and the load switching device (7) that switches an output between the output circuit (6c) and the dummy electric resistor (5a). The load switching device (7) has a total load input position (7a) through which an output of the generator (6a) is directed to both of the dummy electric resistor (5a) and the electric device (8), and a work load input position (7b) through which an output of the generator (6a) is directed to the electric device (8) without directing to the dummy electric resistor (5a).

The electric device (8) is exemplified by lighting equipment and air conditioning apparatus.

Thus, even in a case of an engine generator which is often operated without yielding output to the electric device (8), or often operated at a low level for a long time, the exhaust temperature at the inlet of the exhaust catalyst (34) can be kept at a value exceeding a predetermined set temperature due to an output to the dummy electric resistor (5a), so that HC can dissipate due to catalytic combustion or vaporization before adhering tightly to the inlet or on the surface of the exhaust catalyst (34), making it possible to suppress functional disorder of the exhaust catalyst (34) due to residence of HC at the inlet of exhaust catalyst (34).

Control of load input by the electronic control device (20) will be described with reference to the graph in FIG. 2 and the time chart in FIG. 3.

Figure 3:
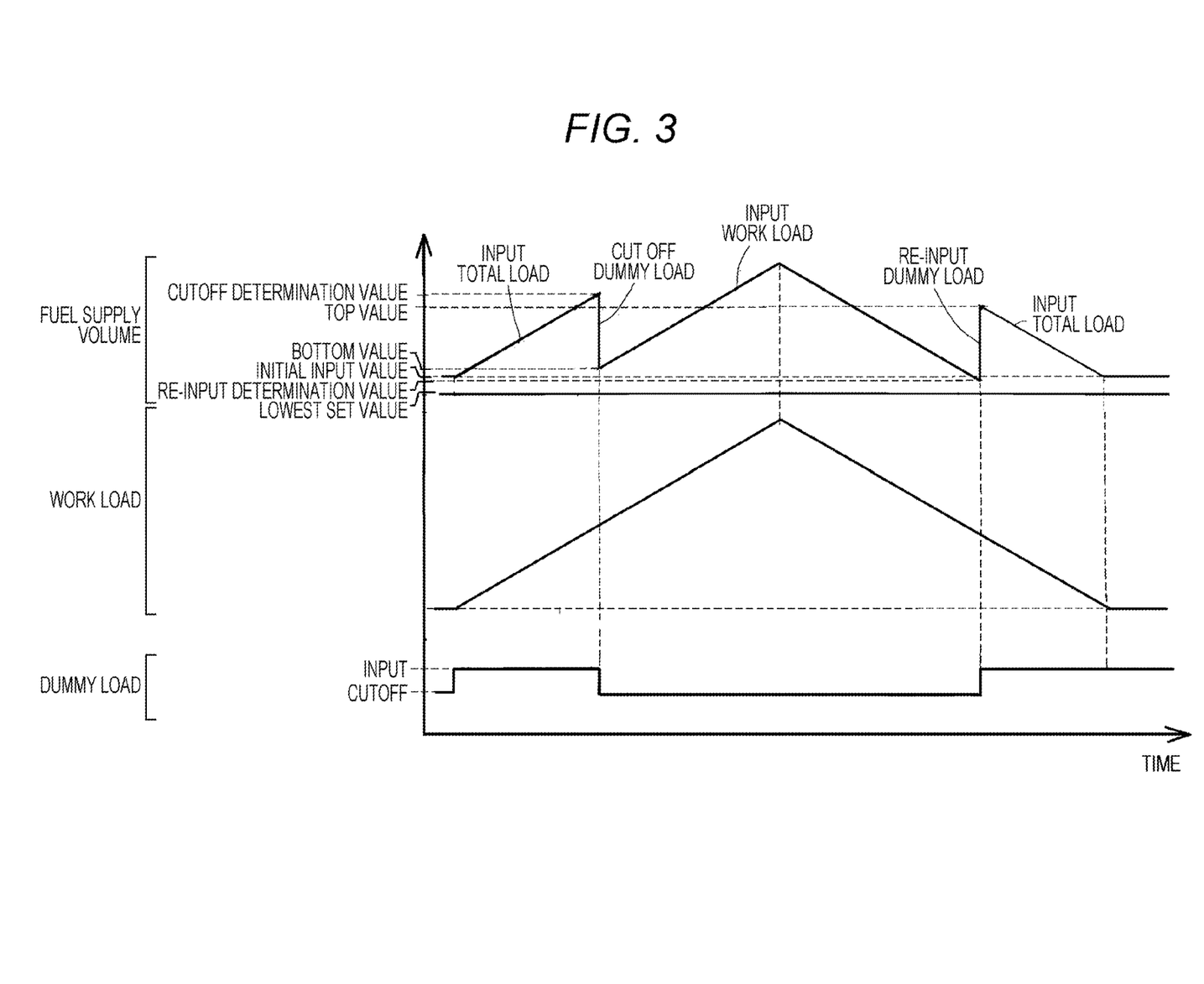
FIG. 3 is a time chart illustrating changes in the fuel supply volume, in response to changes in a work load and a dummy load.

When water temperature of engine cooling water (or may be oil temperature of engine oil) reaches a predetermined value immediately after the engine (E) starts to operate, the dummy load is initially input as illustrated in FIG. 2 or FIG. 3, and the fuel supply volume of the fuel supply device (19a) is set to an initial input value. When, during input of the total load that includes the dummy load and the work load to the engine, the fuel supply volume of the fuel supply device (19a) reaches a predetermined dummy load cutoff determination value as a result of elevation of the work load, then the electronic control device (20) switches the load switching device (7) to cut off the dummy load, and thereby the fuel supply volume falls down to a predetermined bottom value.

Next, when, during input of the work load without including the dummy load to the engine, the fuel supply volume of the fuel supply device (19a) reaches a predetermined dummy load re-input determination value as a result of decline of the work load, then the electronic control device (20) switches the load switching device (7) to re-input the dummy load, and thereby the fuel supply volume elevates up to a predetermined top value.

During engine operation, the fuel supply volume is kept at a value exceeding a predetermined lowest set value, so that the exhaust temperature at the inlet of the exhaust catalyst (34) is kept at a value exceeding a predetermined set value.

The cutoff determination value of dummy load is set higher than a top value of the fuel supply volume when the dummy load is re-input, and the re-input determination value of dummy load is set lower than a bottom value of the fuel supply volume when the dummy load is cut off, so as to create a hysteresis for avoiding hunting during the cutoff and input of the dummy load.

The initial input value and the re-input determination value of the dummy load are set to values exceeding the lowest set value, so that the fuel supply volume, during engine operation, can be kept at a value exceeding the predetermined lowest set value.

The lowest set value of the fuel supply volume is set to a value at which the inlet exhaust temperature of the DOC exceeds the activation temperature of the DOC (200 to 250° C., for example), and HC that adheres to the inlet or on the surface of the DOC can dissipate due to catalytic combustion or vaporization.

Procedures for input and cutoff of the dummy load conducted by the electronic control device (20) will be described with reference to the flowchart in FIG. 4.

Figure 4:
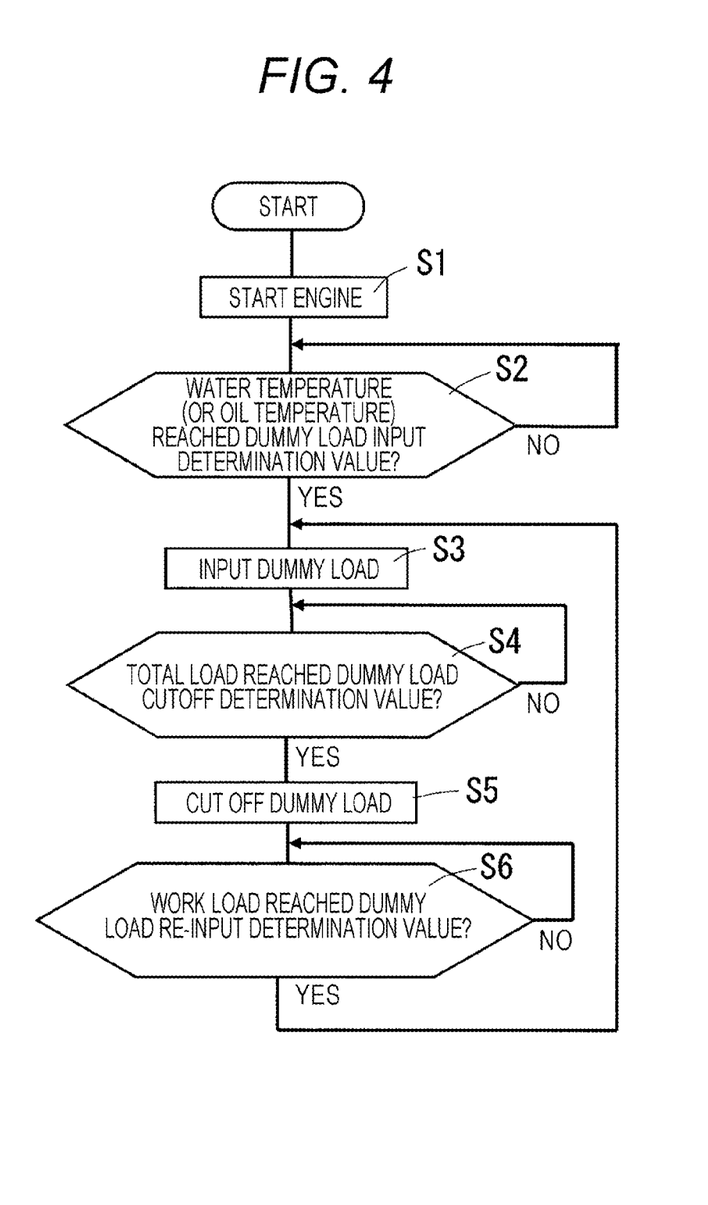
FIG. 4 is a flowchart illustrating input and cutoff of a dummy load conducted by an electronic control device of the engine working machine illustrated in FIG. 1.

As illustrated in FIG. 4, after the engine starts to operate in step (S1), and when water temperature of engine cooling water (or may be oil temperature of engine oil) reaches a predetermined dummy load input determination value in step (S2), the dummy load is input in step (S3), and it is determined whether the total load has reached the dummy load cutoff determination value in step (S4). The determination in step (S4) is repeated until the result turns into YES, and upon determination of YES, the dummy load is cut off in step (S5), and it is determined whether the work load has reached the dummy load re-input determination value in step (S6). The determination in step (S6) is repeated until the result turns into YES, and upon determination of YES, the dummy load is re-input in step (S3).

Procedures for the DPF regenerating treatment conducted by the electronic control device (20) will be described with reference to the flowchart in FIG. 5.

Figure 5:
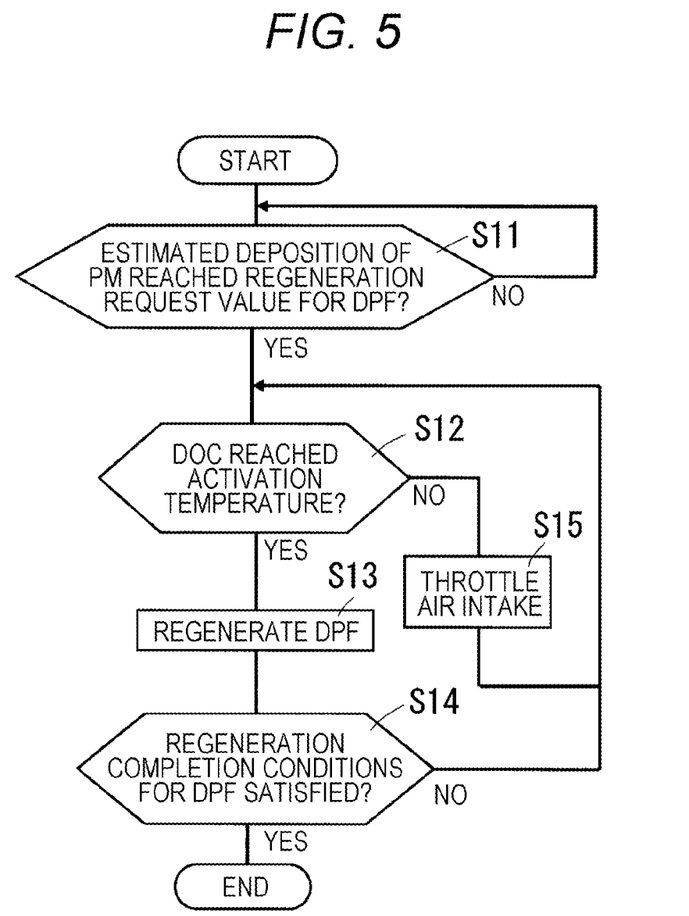
FIG. 5 is a flowchart illustrating a DPF regenerating treatment conducted by the electronic control device of the engine working machine illustrated in FIG. 1.

As illustrated in FIG. 5, it is determined whether the estimated deposition of PM on the DPF (2) has reached the regeneration request value in step (S11). The determination in step (S11) is repeated until the result turns into YES. Upon determination of YES, it is determined whether the DOC (35) has reached activation temperature in step (S12). Upon determination of YES, regeneration of the DPF (2) starts in step (S13), and it is determined whether the regeneration completion conditions for the DPF (2) have been satisfied in step (S14). Upon determination of YES, the process comes to the end, whereas upon determination of NO, the process returns back to step (S12).

The condition for the end of regeneration means that the integrated time, over which the DPF inlet exhaust temperature is kept at a predetermined regeneration request temperature (at around 500° C., for example) as a result of post injection, reaches a predetermined set time (i.e. time period) for ending.

Note that, if the DPF outlet exhaust temperature becomes abnormally high (at around 700° C., for example) during the regeneration of the DPF (2), the post injection is interrupted in order to avoid heat damage of the DPF (2).

When it is determined in step (S12) that the inlet exhaust temperature of the DOC (35) has not reached the activation temperature of the DOC (35), the exhaust (39) is heated in step (S15) by throttling air intake using the intake throttle valve (24), and the process returns back to step (S12).

During engine operation, the inlet exhaust temperature of the DOC (35) usually exceeds the activation temperature of the DOC (35) as a result of input of the dummy load. However in a case where the outdoor temperature is extremely low or in an initial operation of engine, if the inlet exhaust temperature of the DOC (35) does not reach the activation temperature of the DOC (35) despite input of the dummy load, air intake is throttled in step (S15) using the intake throttle valve (24). However, with thus input of the dummy load, the inlet exhaust temperature of the DOC (35) is set higher as compared to a case without the dummy load, so that the degree of throttling of the intake throttle valve (24) is reduced.

What is claimed is:

1. An engine working machine comprising:
   an engine;
   a diesel oxidation catalyst disposed on an exhaust path of the engine;
   a fuel supply device that increases or decreases fuel supply volume towards a combustion chamber in response to increase or decrease of an engine load and that performs post injection to subject unburnt fuel fed to the exhaust path to catalytic combustion in the diesel oxidation catalyst:
   a dummy load device;
   a work load device;
   a load switching device that switches between input and cutoff of a dummy load to and from the engine;
   an electronic control device that controls switching of the load switching device,
   a diesel particulate filter; and
   a particulate matter deposition estimation device estimating an amount of PM deposited on the diesel particulate filter,
   wherein
   when, during input of the dummy load to the engine, the fuel supply volume of the fuel supply device reaches a predetermined dummy load cutoff determination value as a result of elevation of a total load for the engine including the dummy load and a work load, the electronic control device switches the load switching device to cut off the dummy load;
   when, during input of the work load without including the dummy load to the engine, the fuel supply volume of the fuel supply device reaches a predetermined dummy load re-input determination value as a result of decline of the work load, the electronic control device switches the load switching device to re-input the dummy load, and during engine operation, the fuel supply volume is kept at a value exceeding a predetermined set value, so that exhaust temperature at an inlet of the diesel oxidation catalyst disposed on an exhaust upstream side of the diesel particulate filter is kept at a value exceeding an activation temperature of the diesel oxidation catalyst, and hydrocarbon adhering to the inlet or on a surface of the diesel oxidation catalyst dissipates due to catalytic combustion or vaporization even during engine operation when a treatment for regenerating the diesel particulate filter is not entailed until an estimated deposition of the particulate matter on the diesel particulate filter reaches a regeneration request value, when the estimated deposition of the particulate matter on the diesel particulate filter has reached the regeneration request value, the fuel supply device performs post injection to regenerate the diesel particulate filter, and when the engine starts, the dummy load is configured to be input after water temperature of engine cooling water or oil temperature of engine oil reaches a predetermined dummy load input determination value.

2. The engine working machine according to claim 1, wherein the work load device is a generator, an output section of the generator includes:

an output circuit directed to an electric device;

the dummy load device that has a dummy electric resistor; and the load switching device that switches an output between the output circuit and the dummy electric resistor, and, the load switching device includes:

a total load input position through which an output of the generator is directed to both of the dummy electric resistor and the electric device; and a work load input position through which an output of the generator is directed to the electric device without directing to the dummy electric resistor.

* * * * *